United States Patent
Dede et al.

(10) Patent No.: US 9,551,398 B2
(45) Date of Patent: Jan. 24, 2017

(54) TORSIONAL MODE SHIFTING

(71) Applicant: General Electric Company, Schenectady, NY (US)

(72) Inventors: Mehmet Muhittin Dede, Cobleskill, NY (US); Robert Edward Deallenbach, Flat Rock, NC (US); Douglas Arthur Lupe, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 13/832,159

(22) Filed: Mar. 15, 2013

(65) Prior Publication Data
US 2014/0260781 A1    Sep. 18, 2014

(51) Int. Cl.
| F16F 15/22 | (2006.01) |
| B23P 11/00 | (2006.01) |
| F16F 15/315 | (2006.01) |
| F16F 15/34 | (2006.01) |
| F16F 15/32 | (2006.01) |

(52) U.S. Cl.
CPC ........... *F16F 15/315* (2013.01); *F16F 15/322* (2013.01); *F16F 15/34* (2013.01); *Y10T 29/49947* (2015.01); *Y10T 74/2132* (2015.01)

(58) Field of Classification Search
CPC ...... F16F 15/3153; F16F 15/322; F16F 15/34; F16F 15/30; Y10T 29/49826; Y10T 74/2121
USPC ............................ 74/574.3, 572.21; 192/84.3
See application file for complete search history.

(56) References Cited

U.S. PATENT DOCUMENTS

| D59,032 S | 10/1866 | Jucket |
| 477,324 A * | 6/1892 | Coburn ................. 74/572.21 |
| D804,806 | 11/1905 | Gerlach |
| 861,463 A * | 7/1907 | Hyde .................. F16F 15/32 295/6 |
| 1,272,061 A * | 7/1918 | Lake .................. F16F 15/1442 464/74 |

(Continued)

FOREIGN PATENT DOCUMENTS

| EP | 0358167 A2 | 3/1990 |
| EP | 0372724 A2 | 6/1990 |

(Continued)

OTHER PUBLICATIONS

Office Action for US Patent Application no. 14/240,761, dated Jan. 26, 2016, Attorney Docket No. 260848-2 Geen-0411), 28 pp.

(Continued)

*Primary Examiner* — Vinh Luong
(74) *Attorney, Agent, or Firm* — Ernest G. Cusick; Hoffman Warnick LLC

(57) ABSTRACT

One embodiment of the invention includes a system for shifting a torsional mode frequency of a rotary device, the system comprising: a plurality of mass rings, each of the plurality of mass rings comprising: a pair of radially-segmented half rings; and at least one channel through each of the radially-segmented half rings, the at least one channel oriented substantially perpendicular to the radial segmentation of the mass ring, whereby the plurality of mass rings may be aligned and secured through the at least one channel of each radially-segmented half ring such that the radial segmentation of each mass ring is staggered with respect to the radial segmentation of an adjacent mass ring.

9 Claims, 8 Drawing Sheets

(56) References Cited

U.S. PATENT DOCUMENTS

| | | | | |
|---|---|---|---|---|
| 1,497,735 | A * | 6/1924 | Richardson | F16F 15/34 415/104 |
| 1,645,268 | A * | 10/1927 | Walker | F16F 15/30 74/433.5 |
| 1,645,343 | A | 10/1927 | Moorhouse | |
| 1,734,267 | A * | 11/1929 | Moorhouse | F16F 15/30 74/574.2 |
| 2,348,941 | A * | 5/1944 | Ware | 74/574.3 |
| 2,499,618 | A * | 3/1950 | Wolfe | 369/95 |
| 2,539,730 | A * | 1/1951 | Armand Defosse | F16F 15/30 74/572.21 |
| 3,528,316 | A | 9/1970 | Hammer | |
| 3,884,093 | A | 5/1975 | Rabenhorst | |
| 4,102,220 | A * | 7/1978 | Brobeck | F16C 15/00 74/572.11 |
| 4,112,785 | A * | 9/1978 | Brobeck | F16C 15/00 310/74 |
| 4,721,445 | A * | 1/1988 | Hoffmann | F01C 1/104 418/151 |
| 4,821,860 | A * | 4/1989 | Crawford | F16D 13/64 188/218 XL |
| 5,478,421 | A * | 12/1995 | Medney | B29C 53/564 156/161 |
| 5,637,938 | A | 6/1997 | Vukorpa et al. | |
| 5,931,050 | A * | 8/1999 | Roach | B23B 5/02 464/180 |
| 6,135,684 | A * | 10/2000 | Senzaki | B23B 31/00 408/143 |
| 6,186,712 | B1 * | 2/2001 | Senzaki | B23B 31/026 279/125 |
| 6,322,299 | B1 * | 11/2001 | Hartman | B23B 31/006 408/143 |
| 6,794,773 | B2 * | 9/2004 | Jordan | H02K 3/487 310/261.1 |
| 6,883,487 | B2 | 4/2005 | Lehmann et al. | |
| 7,104,133 | B2 | 9/2006 | Kuroda et al. | |
| 7,308,840 | B2 | 12/2007 | Alvarez et al. | |
| 7,753,166 | B2 | 7/2010 | Brockman et al. | |
| 8,013,481 | B2 | 9/2011 | Sommerlatte et al. | |
| 8,146,457 | B2 | 4/2012 | Wright | |
| 8,732,927 | B2 * | 5/2014 | Graham et al. | 29/401.1 |
| 9,079,253 | B2 * | 7/2015 | Bierl | B23B 31/026 |
| 9,366,313 | B2 * | 6/2016 | Lupe | F16F 15/322 |
| 2003/0010594 | A1 * | 1/2003 | Howell | F16D 43/18 192/76 |
| 2006/0272446 | A1 | 12/2006 | Cortright et al. | |
| 2007/0090723 | A1 * | 4/2007 | Keolian | H02N 2/18 310/311 |
| 2007/0188026 | A1 * | 8/2007 | Bi | 310/51 |
| 2008/0088200 | A1 * | 4/2008 | Ritchey | H02K 16/00 310/268 |
| 2012/0111689 | A1 * | 5/2012 | Atkins et al. | 192/84.3 |
| 2012/0227536 | A1 | 9/2012 | Jewett et al. | |
| 2014/0260781 | A1 | 9/2014 | Dede et al. | |
| 2014/0356047 | A1 * | 12/2014 | Vincent | F16D 1/033 403/41 |
| 2015/0097459 | A1 * | 4/2015 | Kalev | H02K 1/2786 310/178 |
| 2016/0025067 | A1 * | 1/2016 | Pristash | F03D 9/007 290/55 |

FOREIGN PATENT DOCUMENTS

| | | | | |
|---|---|---|---|---|
| EP | 0465696 | A1 | 1/1992 | |
| EP | 0646435 | A1 | 4/1995 | |
| EP | 2034213 | A1 * | 3/2009 | F16F 15/3153 |
| GB | 3524 | * | 0/1910 | F16F 15/3153 |
| WO | WO 2009/065315 | A1 * | 5/2009 | |

OTHER PUBLICATIONS

Notice of Allowance in U.S. Appl. No. 14/420,760 dated Apr. 11, 2016, 13 pages.

* cited by examiner

TORSIONAL MODE SHIFTING

BACKGROUND OF THE INVENTION

Embodiments of the invention relate generally to rotary devices and, more particularly, to systems, devices, and methods for shifting a torsional mode frequency of a rotary device.

Rotary devices are known to suffer from various vibration problems during their operation. One such vibration problem is torsional vibration. In all practical rotor systems there is no inherent ability to damper torsional vibration.

When a power train torsional mode is near to a continuous forcing function, such as twice a line frequency of a power generating unit (e.g., a steam turbine-generator system), torsional vibration may be so severe that continuous safe operation of the unit is not possible. Typically, this results in activation of a tripping system and the unit is shut down.

Currently, since the line frequency cannot be changed, torsional vibration is addressed by disassembling the device and shrink fitting a large number of rings on an outer surface of a rotor flange. The device is then reassembled and tested to confirm a reduction in torsional vibration. This process is both time consuming (typically 30-40 days) and consequently expensive, resulting in significant downtime for the device and a concomitant loss of revenue.

BRIEF DESCRIPTION OF THE INVENTION

In one embodiment, the invention provides a system for shifting a torsional mode frequency of a rotary device, the system comprising: a plurality of mass rings, each of the plurality of mass rings comprising: a pair of radially-segmented half rings; and at least one channel through each of the radially-segmented half rings, the at least one channel oriented substantially perpendicular to the radial segmentation of the mass ring, whereby the plurality of mass rings may be aligned and secured through the at least one channel of each radially-segmented half ring such that the radial segmentation of each mass ring is staggered with respect to the radial segmentation of an adjacent mass ring.

In another embodiment, the invention provides a device for shifting a torsional mode frequency of a rotary device, the device comprising: a first radially-segmented half ring; a second radially-segmented half ring; and at least one channel through each of the first radially-segmented half ring and the second radially-segmented half ring, the at least one channel oriented substantially perpendicular to the radial segmentation.

In still another embodiment, the invention provides a method of shifting a torsional mode frequency of a rotary device, the method comprising: applying to a rotating member of a rotary device a plurality of mass rings, each of the plurality of mass rings comprising a pair of radially-segmented half rings, such that a segmentation between each pair of radially-segmented half rings is staggered with respect to a segmentation between an adjacent pair of radially-segmented half rings; and fastening together the plurality of mass rings using a plurality of fasteners extending through each of the plurality of mass rings.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

Figure 1:
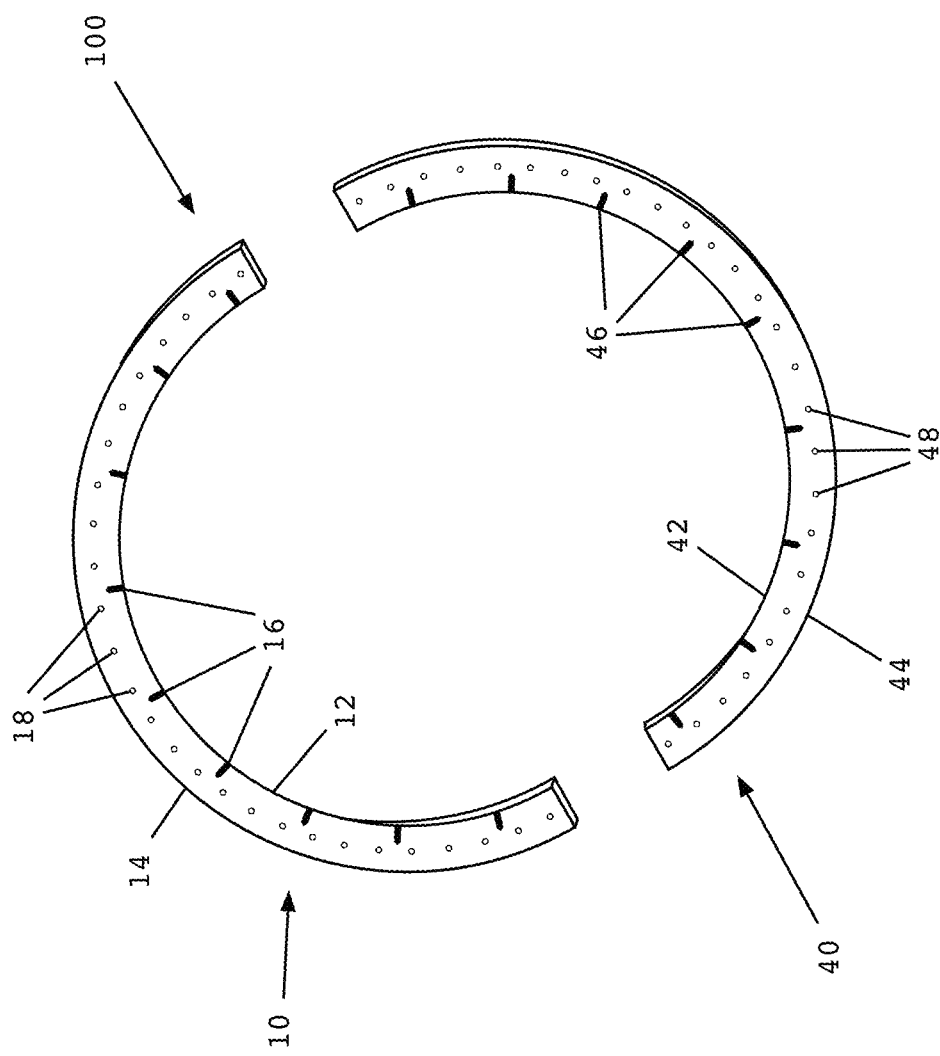
FIGS. 1 and 2 show perspective views of a mass ring according to an embodiment of the invention.

FIG. 1 shows a perspective view of a mass ring 100 for shifting a torsional mode frequency of a rotary device. Mass ring 100 includes a first radially-segmented half ring 10 and a second radially-segmented half ring 40. Each of the first and second radially-segmented half rings 10, 40 includes an inner circumferential surface 12, 42 and an outer circumferential surface 14, 44. Each of the first and second radially-segmented half rings 10, 40 also includes a plurality of channels 18, 48, the use of which will be explained in greater detail below. In some embodiments of the invention, channels 18, 48 comprise a bolt hole for receiving a threaded bolt (not shown).

In some embodiments of the invention, each of first and second radially-segmented half rings 10, 40 may also include a plurality of radially-spaced slots 16, 46 along the inner circumferential surface 12, 42. Each of the plurality of radially-spaced slots 16, 46 is operable to receive a radial guide post positioned along a circumference of a rotating member, as will be described below.

Figure 2:
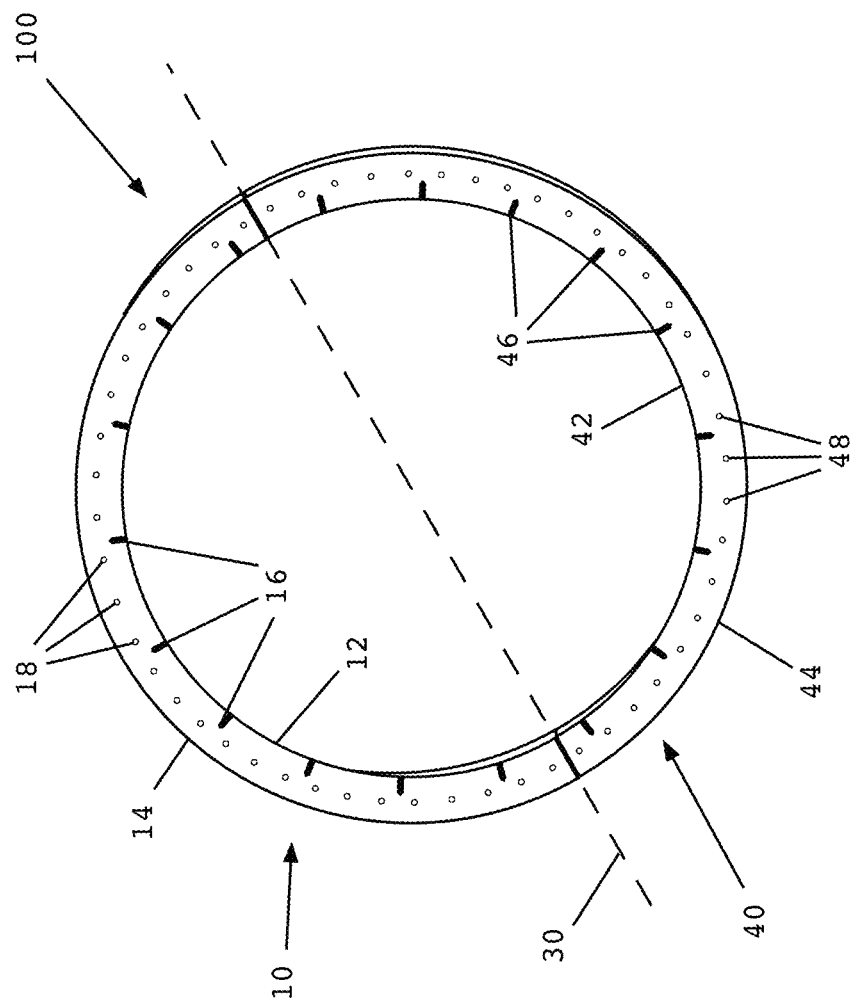

FIG. 2 shows mass ring 100 with first and second radially-segmented half rings 10, 40 positioned as they would be when installed on a rotary device. In FIG. 2, the radial segmentation 30 of mass ring 100 can clearly be seen.

Figure 3:
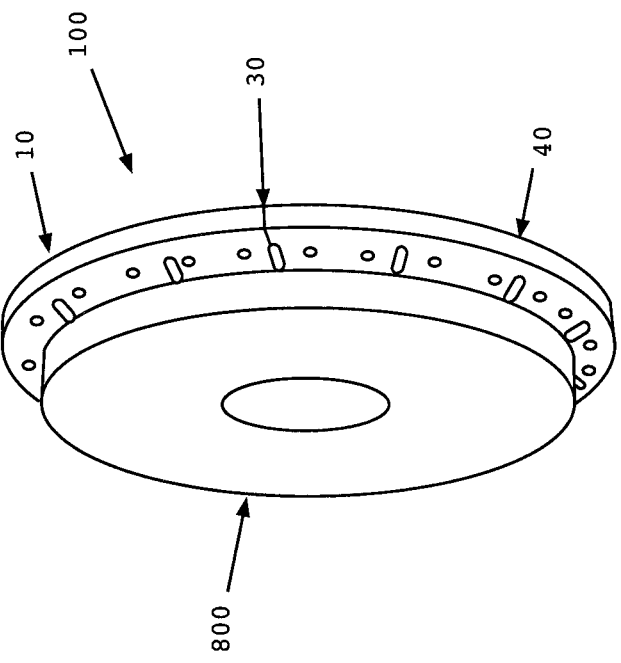
FIGS. 3 and 4 show perspective views of a mass ring according to an embodiment of the invention being positioned on a rotating member.

FIG. 3 shows a perspective view of first radially-segmented half ring 10 positioned on a rotating member 800. Rotating member 800 includes, along its circumference, a plurality of radial guide posts 816 operable to fit within the radially-spaced slots 16 (FIGS. 1-2) of first radially-segmented half ring 10. Radial guide posts 816 help ensure proper alignment of first radially-segmented half ring 10 along the circumference of rotating member 800.

Typically, radial guide posts 816 will be placed along and within a slot of rotating member 800 such as may be used for balancing rotating member 800, as will be recognized by one skilled in the art. Radial guide posts 816 and radially-spaced slots 16 may employ a friction fit or similar mechanism for ensuring a snug fit of radial guide posts 816 within radially-spaced slots 16.

In some embodiments of the invention, and as shown in FIG. 3, radially-spaced slots 16 may be "hemi-slots," operable to contain a portion, but less than all, of each radial guide post 816. That is, as will be explained in greater detail below, each radial guide post 816 may be contained within the "hemi-slot" of a first radially-segmented half ring and the "hemi-slot" of an additional radially-segmented half ring stacked adjacent the first radially-segmented half ring, such that each guide post 816 is sandwiched between two adjacently-stacked mass rings.

Figure 4:
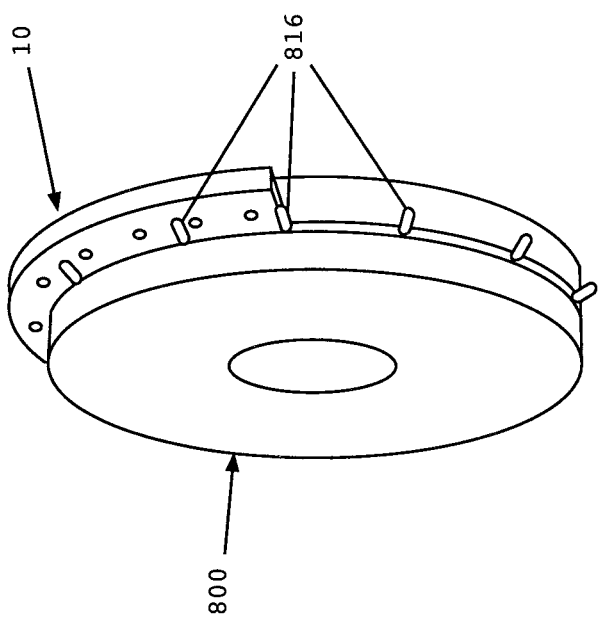
Figure 5:
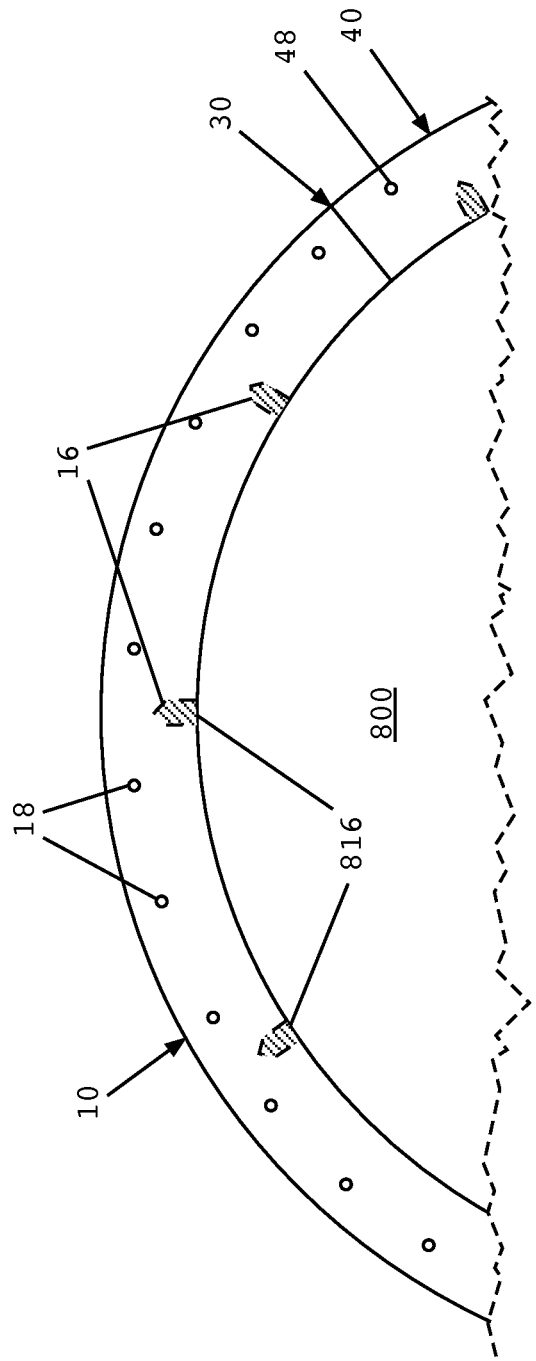
FIG. 5 shows a partial facing view of the mass ring of FIGS. 3 and 4 positioned on the rotating member.

FIG. 4 shows second radially-segmented half ring 40 similarly positioned on rotating member 800, such that a first mass ring 100 is formed. One end of radial segmentation 30 may be seen in FIG. 4, the other end being obscured by rotating member 800. FIG. 5 shows a partial facing view of first and second radially-segmented half rings 10, 40 positioned on rotating member 800. Radial guide posts 816 can be seen disposed within radially-spaced slots 16.

Figure 6:
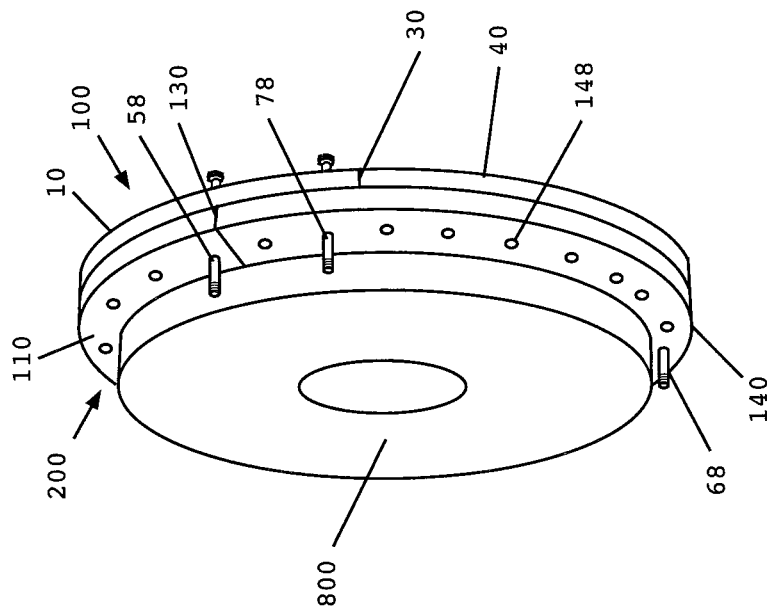
FIGS. 6-8 show perspective views of additional mass rings positioned on a rotating member.

FIG. 6 shows a perspective view of the positioning of a third radially-segmented half ring 110 on rotating member 800. As can be seen in FIG. 6, third radially-segmented half ring 110 is positioned with respect to first mass ring 100 such that segmentation 30 of first mass ring 100 is staggered from a first end 111 of third radially-segmented half ring 110. The details of such staggering, according to some embodiments of the invention, will be described in greater detail below.

Third radially-segmented half ring 110 may be fastened to first mass ring 100, and specifically to first and second radially-segmented half rings 10, 40, respectively, using a first fastener 58 and a second fastener 68. First fastener 58 may be passed through a channel 18 (FIG. 1) of first radially-segmented half ring 10 and a corresponding channel 118 of third radially-segmented half ring 110. Similarly, second fastener 68 may be passed through a channel 48 (FIG. 1) of second radially-segmented half ring 40 and a corresponding channel (obscured by rotating member 800) of third axially-segmented half ring 110.

Figure 7:
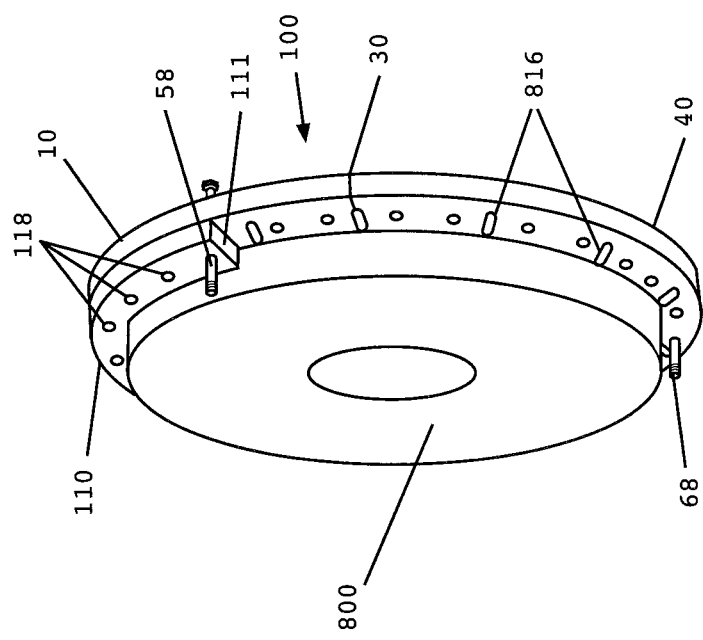

FIG. 7 shows fourth radially-segmented half ring 140 positioned on rotating member 800 and adjacent third radially-segmented half ring 110 to form a second mass ring 200 adjacent first mass ring 100. As shown in FIG. 7, segmentation 130 of second mass ring 200 is staggered with respect to segmentation 30 of first mass ring 100. Such staggering provides improved strength, particularly in an circumferential direction, of both first and second mass rings 100, 200.

Similar to the description above, as shown in FIG. 7, fourth radially-segmented half ring 140 may be fastened to first radially-segmented mass ring 10 and second radially-segmented half ring 40 through channels 18, 48 (FIG. 1), 148 of first, second, and fourth radially-segmented mass rings 10, 40, 140, respectively, using one or more fasteners 78.

Figure 8:
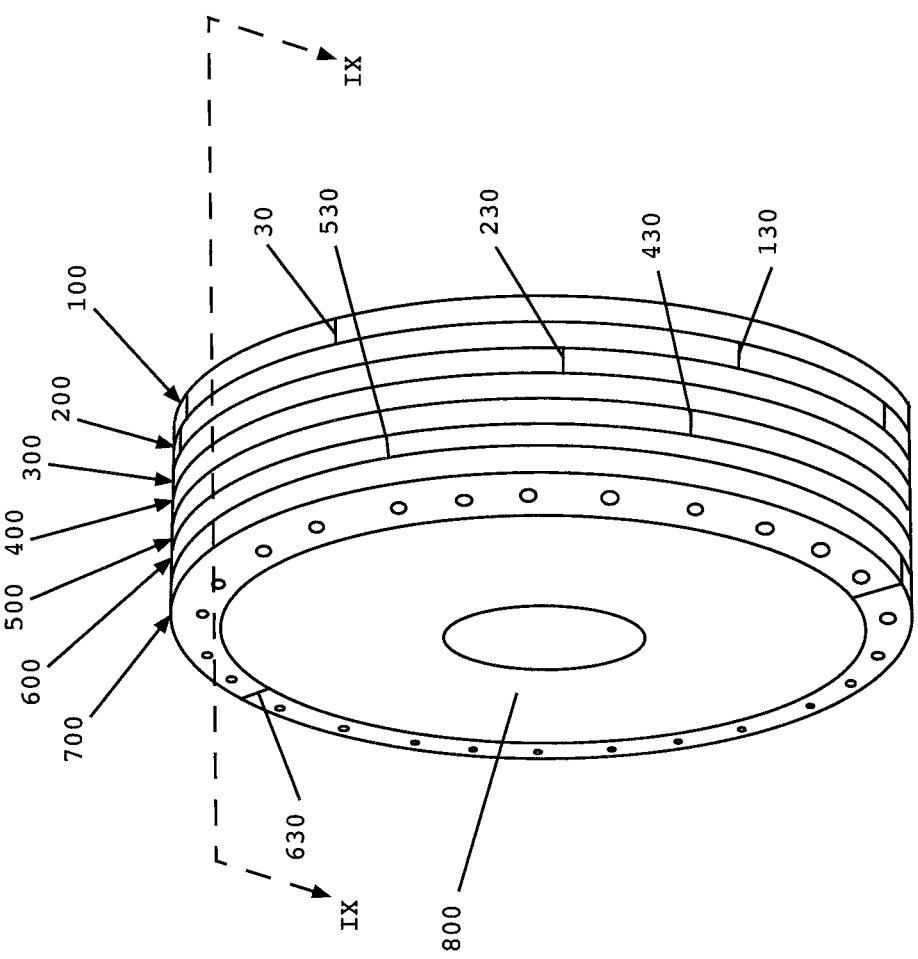

FIG. 8 shows a total of seven mass rings 100, 200, 300, 400, 500, 600, 700 so stacked (i.e., a first mass ring 100, a second mass ring 200, a third mass ring 300, a fourth mass ring 400, a fifth mass ring 500, a sixth mass ring 600, and a seventh mass ring 700). Each mass ring is preferably staggered such that its radial segmentation 30, 130, 230, 430, 530, 630 (radial segmentation 330 of ring mass 400 being obscured from view in FIG. 8) is staggered with respect to the radial segmentation of any adjacently stacked mass ring. For example, as shown in FIG. 8, the radial segmentation 130 of mass ring 200 is staggered with respect to radial segmentation 30 of mass ring 100 and radial segmentation 230 of mass ring 300.

Such stacking of adjacent mass rings may continue using any number of mass rings until a total mass of all mass rings is sufficient to shift a torsional mode frequency of the device. In some embodiments of the invention, the rotating member will be rotated clockwise between the installation of the first mass ring and the second mass ring, and will then be rotated counterclockwise between the installation of the second mass ring and the third mass ring. Such alternating clockwise/counterclockwise rotation may be repeated until all desired mass rings are installed. Whether the initial rotation between installation of the first mass ring and the second mass ring is clockwise or counterclockwise is of no importance. Alternating the clockwise and counterclockwise rotation of the rotating member, however, helps to ensure that the segmentations of each mass ring remain staggered.

The total number of mass rings employed may vary, of course, depending upon, for example, the degree of torsional mode frequency shifting to be achieved, the size and composition of the mass rings employed, etc. In some embodiments, a total mass of the plurality of mass rings employed is sufficient to shift the torsional mode frequency downward by about 1.5-4 Hz or even lower from the original torsional mode frequency. For example, where the original, unshifted torsional mode frequency is very close to 120 Hz (i.e., double the standard US electrical line frequency of 60 Hz), the total mass of the plurality of mass rings may be sufficient to shift the torsional mode frequency to between about 118.5 Hz and about 116 Hz, or even lower frequencies depending on the sensitivity of the mode.

In some embodiments, the total mass of the plurality of mass rings is sufficient to shift the torsional mode frequency of the device by 10 Hz. That is, continuing with the embodiment above, the total mass of the plurality of mass rings is sufficient to decrease the torsional mode frequency to about 110 Hz. Such a degree of shifting is more than sufficient to overcome the most significant effects of torsional vibration, since the effects of torsional vibration diminish as the continuous forcing function increases.

Figure 9:
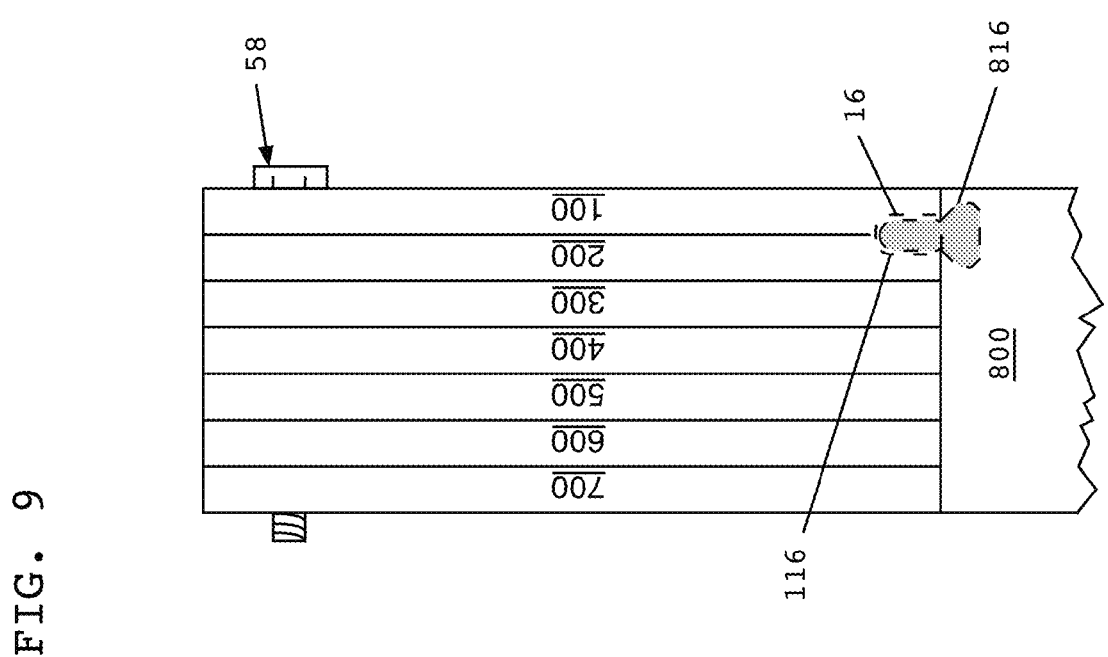
FIG. 9 shows a side view of a plurality of mass rings positioned on a rotating member taken along plane IX-IX of FIG. 8.

FIG. 9 shows a cross-sectional side view of the mass rings 100, 200, 300, 400, 500, 600, 700 of FIG. 8. Fastener 58, in this case a threaded bolt, fastens each mass ring. Radial guide pin 816, shown in phantom between mass ring 100 and mass ring 200 may also be seen. As can be seen in FIG. 9, radial slots 16, 116 of mass rings 100 and 200, respectively, are "hemi-slots," which together form a unitary radial slot into which radial guide pin 816 may be fitted. Although radial guide pin 816 is shown between mass ring 100 and mass ring 200, this is not essential. Radial guide pins may be positioned between any two adjacent mass rings or, in some embodiments, within a single mass ring.

Figure 10:
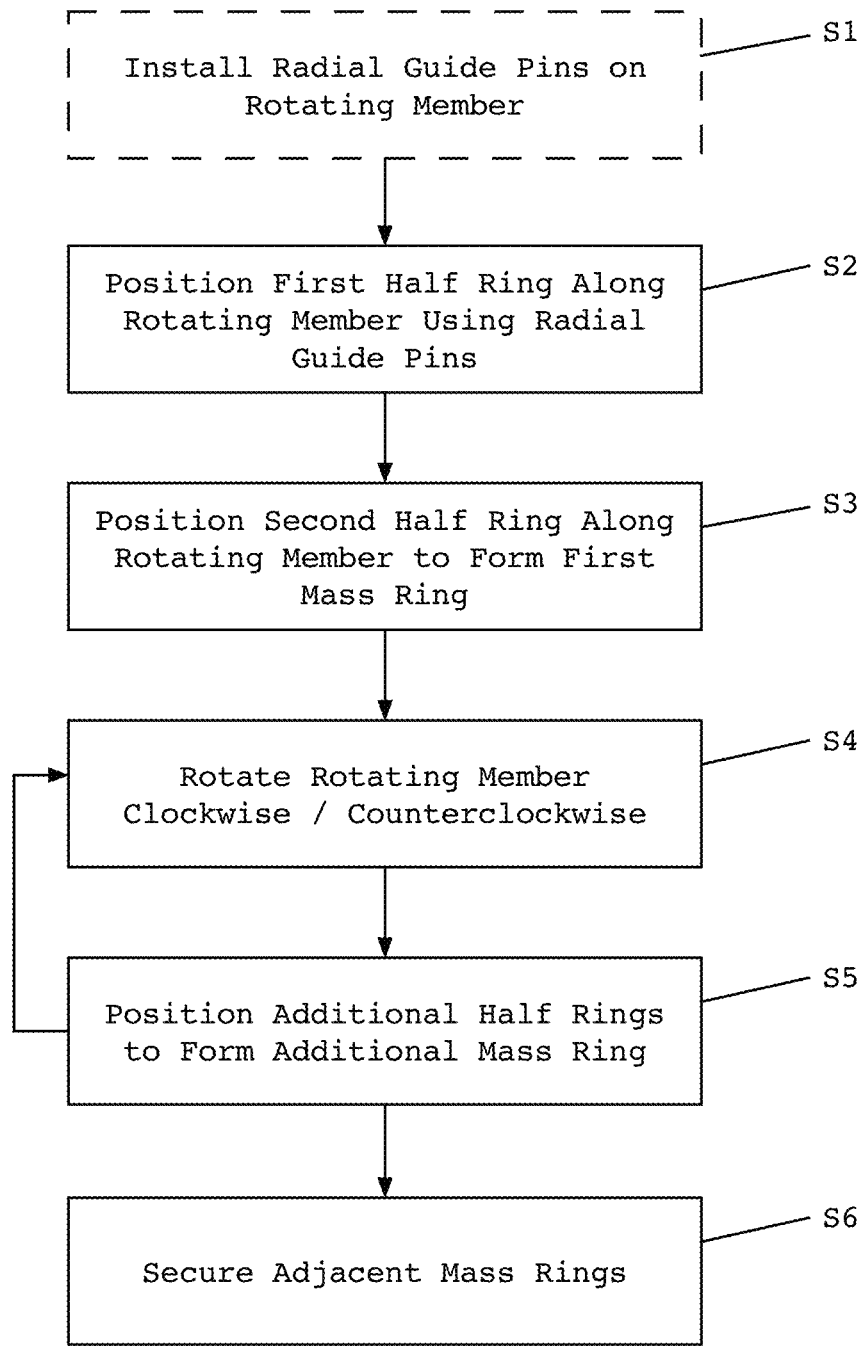
FIG. 10 shows a flow diagram of an illustrative method according to one embodiment of the invention.

FIG. 10 shows a flow diagram of an illustrative method according to an embodiment of the invention. At S1, if not already in place, radial guide pins may optionally be installed along the rotating member, as shown, for example, in FIG. 3. At S2, a first radially-segmented half ring is positioned along a surface of the rotating member using the radial guide pins. At S3, a second radially-segmented half ring is positioned along the surface of the rotating member using the radial guide pins to form a first half ring.

At S4, the rotating member is rotated, either clockwise or counterclockwise, and at S5 an additional pair of radially-segmented half rings is positioned along the rotating member to form an additional mass ring. S4 and S5 may be iteratively looped until the desired number of mass rings is installed on the rotating member. As noted above, if S4 and S5 are iteratively looped, the rotation at S4 is alternately clockwise and counterclockwise. Finally, once all desired mass rings are in place, they may be secured together at S6, as, for example, shown in FIGS. 8 and 9.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
    a plurality of mass rings including:
        a first mass ring having a first hemi-slot;
        a second mass ring having a second hemi-slot, the second mass ring being directly adjacent the first mass ring and the first and second hemi-slots being adjacent and forming a slot;
        a third mass ring adjacent the first mass ring, the third mass ring not having a slot along an inner circumference of the third mass ring; and
        a fourth mass ring adjacent the second mass ring, the fourth mass ring not having a slot along an inner circumference of the fourth mass ring, each of the plurality of mass rings comprising:
            a pair of radially-segmented half rings; and
            at least one channel through each of the radially-segmented half rings, the at least one channel oriented substantially perpendicular to the radial segmentation of the mass ring,
    whereby the plurality of mass rings is aligned and secured through the at least one channel of each radially-segmented half ring such that the radial segmentation of each mass ring is staggered with respect to the radial segmentation of an adjacent mass ring,
    wherein at least one of the plurality of mass rings includes a plurality of slots radially spaced along an inner circumference of each half ring for receiving a plurality of radial guide posts along a circumference of a rotating member, each of the plurality of slots comprising a hemi-slot extending radially into but not through the half ring.

2. The system of claim 1, further comprising:
    the plurality of radial guide posts for positioning along a circumference of the rotating member.

3. The system of claim 1, wherein the plurality of mass rings includes at least seven mass rings.

4. The system of claim 1, wherein a total mass of the plurality of mass rings shifts a torsional mode frequency of the rotating member downward by between 1.5 Hz and 10 Hz from an unshifted torsional mode frequency.

5. The system of claim 4, wherein the total mass of the plurality of mass rings shifts the torsional mode frequency downward by between 3 Hz and 10 Hz from the unshifted torsional mode frequency.

6. The system of claim 4, wherein the total mass of the plurality of mass rings shifts the torsional mode frequency from 120 Hz to between 118.5 Hz and 110 Hz.

7. The system of claim 4, wherein the total mass of the plurality of mass rings shifts the torsional mode frequency from 100 Hz to between 108.5 Hz and 90 Hz.

8. The system of claim 1, further comprising:
    a plurality of fasteners for fastening each of the plurality of mass rings through the at least one channel of each of the radially-segmented half rings.

9. The system of claim 8, wherein each of the plurality of fasteners includes a bolt sized to pass through the at least one channel of each of the radially-segmented half rings.

* * * * *